United States Patent
Silverberg et al.

(10) Patent No.: US 10,571,367 B1
(45) Date of Patent: Feb. 25, 2020

(54) POWER TOOL USAGE AUDITOR

(71) Applicants: Aaron G. Silverberg, San Diego, CA (US); Sam Silverberg, Portland, OR (US); Edward S. Silverberg, San Diego, CA (US)

(72) Inventors: Aaron G. Silverberg, San Diego, CA (US); Sam Silverberg, Portland, OR (US); Edward S. Silverberg, San Diego, CA (US)

( * ) Notice: Subject to any disclaimer, the term of this patent is extended or adjusted under 35 U.S.C. 154(b) by 516 days.

(21) Appl. No.: 14/704,883

(22) Filed: May 5, 2015

Related U.S. Application Data

(60) Provisional application No. 61/988,545, filed on May 5, 2014.

(51) Int. Cl.
*G01H 3/12* (2006.01)
*B23Q 17/00* (2006.01)
*G01M 99/00* (2011.01)

(52) U.S. Cl.
CPC ......... *G01M 99/005* (2013.01); *B23Q 17/008* (2013.01); *G01H 3/12* (2013.01)

(58) Field of Classification Search
CPC ............... G01N 29/42; G01N 29/4409; G01N 29/4427; G01N 29/4436; G01N 29/30; G01N 29/34; G01N 29/36; G01N 29/44; G01M 99/005; B23Q 2017/001; G01H 11/06; G01H 11/08; G01H 1/003
USPC .......................... 73/579, 587, 593, 645, 646
See application file for complete search history.

(56) References Cited

U.S. PATENT DOCUMENTS

| | | | | |
|---|---|---|---|---|
| 4,704,693 A | * | 11/1987 | Thomas | B23Q 17/12 340/680 |
| 4,918,427 A | * | 4/1990 | Thomas | G08B 21/187 340/680 |
| 5,076,102 A | * | 12/1991 | Sato | B23B 49/001 340/680 |
| 6,289,735 B1 | * | 9/2001 | Dister | G01H 13/00 73/579 |
| 8,517,642 B2 | * | 8/2013 | Borunda | B23B 49/00 324/67 |
| 2005/0000998 A1 | * | 1/2005 | Grazioli | B25B 27/0085 227/2 |
| 2006/0074513 A1 | * | 4/2006 | DeRose | G07C 3/00 700/175 |

(Continued)

*Primary Examiner* — Suman K Nath
(74) *Attorney, Agent, or Firm* — Spano Law Group; Joseph S. Spano

(57) ABSTRACT

Methods and systems for characterizing actual tool usage based on measurements of tool activity are presented herein. In some embodiments, a power tool usage auditor (PTUA) includes a sound measuring device offset from the surface of a power tool. The sound measuring device senses sound waves emitted from the surface of power tool and generates an electrical signal indicative of the sound emitted from the surface of the power tool. In some other embodiments, a PTUA includes a magnetic field measuring device that senses changes in magnetic field induced by motion generated by the power tool. A processor is configured to receive electrical signals indicative of tool activity and generate a signal indicative of actual tool usage. Furthermore, methods and systems for communicating an indication of actual tool usage to a user or another computing system without interfering with the operation of the tool are also presented.

20 Claims, 6 Drawing Sheets

(56) References Cited

U.S. PATENT DOCUMENTS

2009/0091465 A1* 4/2009 Buckingham ............ A61B 5/11
  340/683
2014/0150588 A1* 6/2014 Christiansson ......... F16H 55/17
  74/434

* cited by examiner

POWER TOOL USAGE AUDITOR

CROSS REFERENCE TO RELATED APPLICATION

The present application for patent claims priority under 35 U.S.C. § 119 from U.S. provisional patent application Ser. No. 61/988,545, entitled "Power Tool Usage Monitor," filed May 5, 2014, the subject matter of which is incorporated herein by reference in its entirety.

TECHNICAL FIELD

The described embodiments relate to monitoring of power tool usage for performance evaluation and maintenance oversight.

BACKGROUND INFORMATION

Many types of power tools are subject to periodic maintenance and calibration to ensure proper performance. The reliable operation of power tools in an organized manufacturing setting is important to ensure consistent manufacturing workflow. Furthermore, the accuracy of power tool operation is often critical to ensure the reliability of the final manufactured good.

Typically, power tools are subject to maintenance and calibration procedures at fixed, scheduled time intervals. However, the need for maintenance and calibration is most often driven by actual tool usage. For operational scenarios with predictable tool usage, the simple passing of time may be a reasonable approximation of actual tool usage. However, for tools subject to intermittent and irregular use, fixed, scheduled maintenance intervals are likely to be an inaccurate measure of actual tool use, and may lead to either inadequate or excessive maintenance.

Improvements to systems for estimating actual usage of a power tool and communicating an indication of the actual tool usage without interfering with the operation of the tool are desired.

SUMMARY

Methods and systems for characterizing actual tool usage based on a measurement of sound emitted from the tool are presented herein. Furthermore, methods and systems for communicating an indication of actual tool usage to a user or another computing system without interfering with the operation of the tool are also presented.

In one aspect, a power tool usage auditor (PTUA) senses activity on the part of a power tool and communicates an indication of that activity to a user or an external computing system.

In one embodiment, a (PTUA) includes a sound measuring device offset from the surface of a power tool. The sound measuring device senses sound waves emitted from the surface of power tool and generates an electrical signal indicative of the sound emitted from the surface of the power tool.

In another embodiment, a power tool usage auditor (PTUA) includes a magnetic field measuring device offset from a surface of a power tool. The magnetic field measuring device senses changes in magnetic field induced by motion generated by the power tool. The magnetic field measuring device generates an electrical signal indicative of the motion generated by the power tool.

A processor is configured to receive the electrical signals indicative of tool activity and generate a signal indicative of actual tool usage. In some examples, the processor is configured to determine the transition between an off cycle and an on cycle of the power tool by identifying when the magnitude of the electrical signal exceeds a predetermined threshold value. Similarly, the processor is configured to determine the transition between an on cycle and an off cycle by identifying when the magnitude of the electrical signal is less than the predetermined threshold value. In addition, the processor is configured to determine the periods of time when the tool is in use.

In a further aspect, the processor is configured to determine whether a successful tool operation has taken place based on the measured electrical signal. In one example, the processor is configured to compare the duration of each period of tool use with a predetermined time window indicative of a successful tool operation to determine whether a successful tool operation has taken place. In another example, the processor is configured to compares the amplitude of the electrical signal during each tool usage cycle to a predetermined threshold value to determine degradation or failure of a particular power tool.

In another further aspect, the PTUA includes one or more communication interfaces to transmit signals indicative of actual tool usage from the power tool to an external computing system and receive signals indicative of operational parameters (e.g., threshold values used by the PTUA for signal analysis.

In yet another further aspect, the PTUA is configured to record the sound emitted from the surface of a power tool during one or more desirable tool operations. The PTUA is further configured to analyze the recorded signal to determine one or more threshold values used for subsequent signal analysis.

In some embodiments, the PTUA includes a display device suitable for communicating indications of actual tool usage to a user directly without interfering with tool usage.

In another further aspect, the PTUA includes a passive vibration measurement device, such as a piezoelectric vibration sensor, to detect vibration of the power tool. The detected vibration is employed as a trigger signal to "wake-up" electronic circuits of PTUA. In this manner, the PTUA can operate in a "sleep" mode with a minimum of power consumption, until triggered to "wake-up" and begin monitoring actual tool usage.

In yet another further aspect, data communicated from the PTUA is presented on a display of an external computing system. An external computing system may be a personal computer, mobile computer, or other electronic device configured to receive actual tool usage data from the PTUA, process the data, and present useful indications (e.g., performance metrics, maintenance logs, estimations of remaining tool life, etc.) to a user.

In yet another further aspect, the PTUA is configured to perform a frequency analysis of sound signals to determine frequency components of the measured signals. These frequency components are employed to determine indications actual tool usage such as tool degradation or failure or success or failure of tool operation.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the

DETAILED DESCRIPTION

Reference will now be made in detail to background examples and some embodiments of the invention, examples of which are illustrated in the accompanying drawings.

Figure 1:
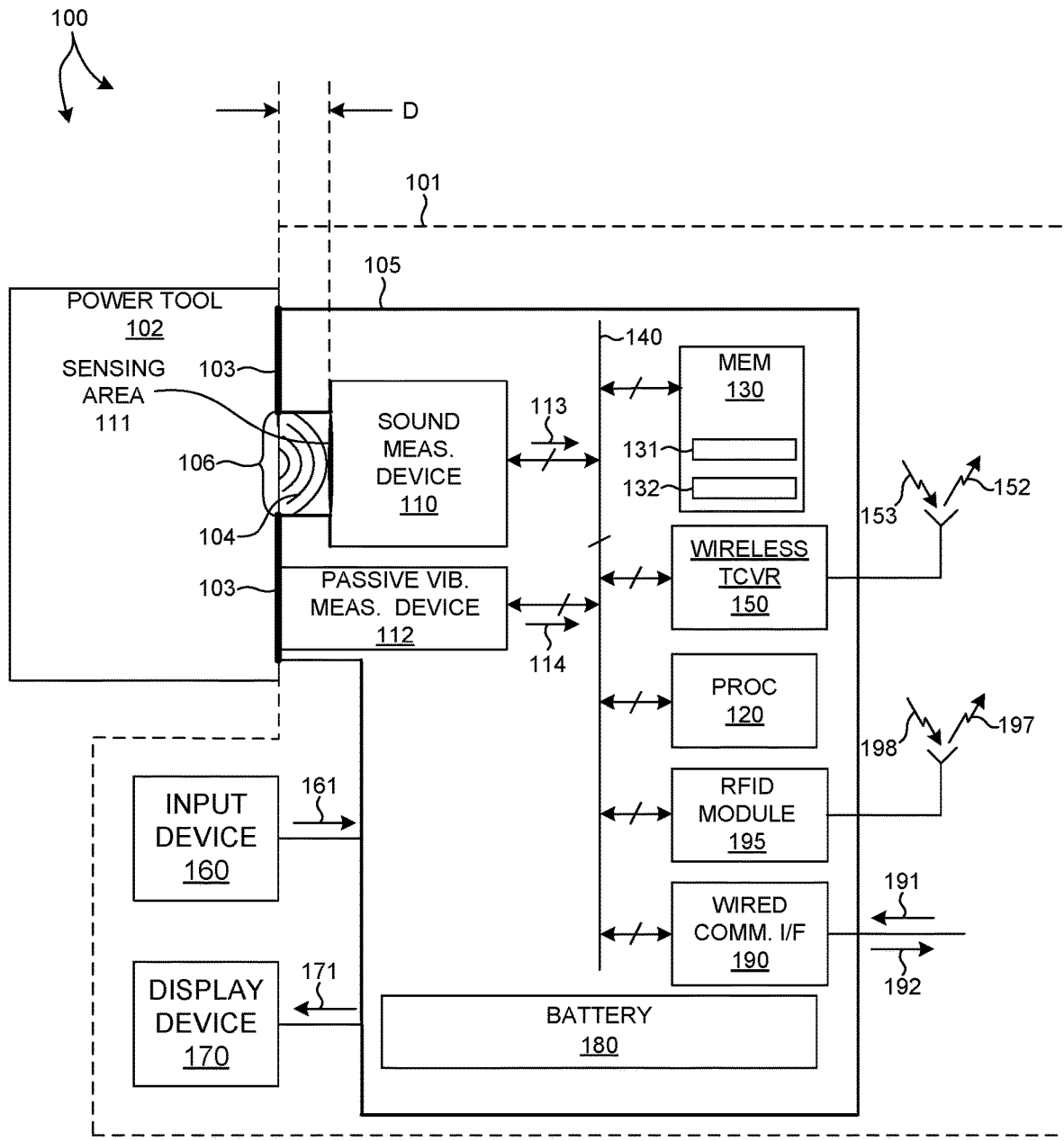
FIG. 1 illustrates a system 100 for characterizing actual tool usage based on a measurement of sound emitted from the tool and communicating an indication of actual tool usage without interfering with the operation of the tool.

FIG. 1 depicts a system 100 for characterizing actual tool usage based on a measurement of sound emitted from the tool and communicating an indication of actual tool usage without interfering with the operation of the tool.

System 100 includes a power tool usage auditor (PTUA) 101 including a housing 105 that is mechanically coupled to a power tool 102 over a mechanical interface area 103. Housing 105 is not mechanically coupled to power tool 102 over a portion 106 of the surface of power tool 102. PTUA 101 includes a sound measuring device 110, a passive vibration measurement device 112, a memory 130, a processor 120, a wireless communication transceiver 150, a Radio Frequency Identification (RFID) module 195 and a wired communication interface 190. Each of these elements is communicatively coupled over bus 140.

Sound measuring device 110 is coupled to housing 105 and offset from the portion 106 of the surface of power tool 102 not mechanically coupled to housing 105 by offset distance, D, depicted in FIG. 1. In this manner, the housing provides a direct path for sound waves to travel from the power tool to the sound measuring device across the portion of the surface of the power tool not mechanically coupled to the housing. Sound measuring device 110 includes a sensing area 111 that senses sound waves 104 emitted from the portion 106 of the surface of power tool 102. Sound measuring device 110 is configured to generate an electrical signal 113 indicative of the sound emitted from the surface of power tool 102. As depicted in FIG. 1, sound measuring device 110 includes an analog to digital converter (ADC). Thus, sound measuring device 110 is able to generate a digital signal 113 indicative of the sound emitted from power tool 102. In some other embodiments, an analog microphone such as the omnidirectional microphone (part number ADMP401) manufactured by Analog Devices, Inc., Norwood, Mass. (USA) is employed. In these embodiments, the microphone generates an analog output and an ADC is employed to generate a digital signal indicative of the sound emitted from power tool 102.

Figure 7:
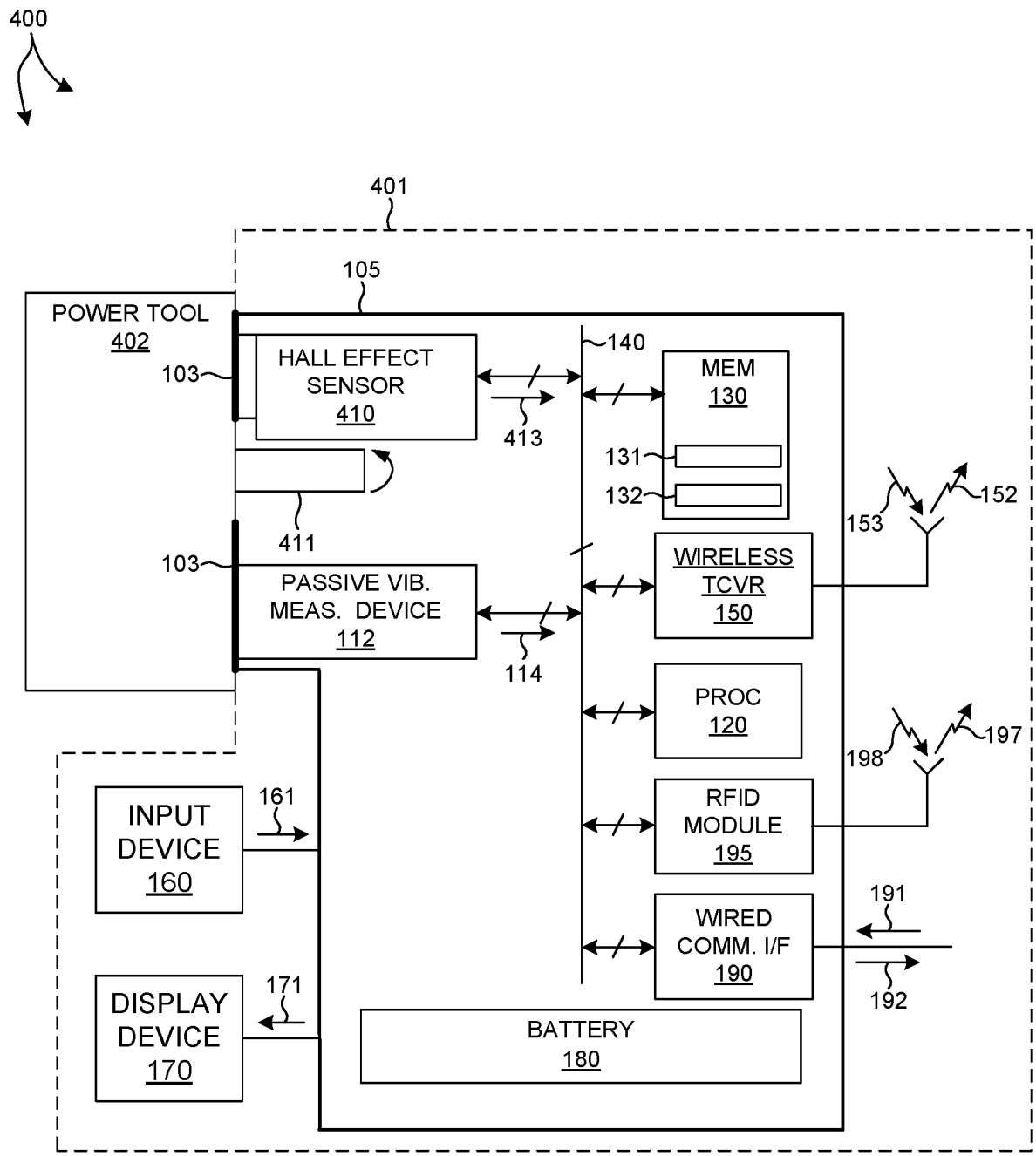
FIG. 7 illustrates a system 400 for characterizing actual tool usage based on a measurement of motion generated by the tool and communicating an indication of actual tool usage without interfering with the operation of the tool.

FIG. 7 depicts a system 400 for characterizing actual tool usage based on a measurement of motion generated by the tool and communicating an indication of actual tool usage without interfering with the operation of the tool. System 400 includes like numbered elements similar to those described with reference to FIG. 1.

System 400 includes a power tool usage auditor (PTUA) 401 including a housing 105 that is mechanically coupled to a power tool 402 over a mechanical interface area 103. PTUA 401 includes a magnetic field measuring device 410 (e.g., a Hall-effect sensor), a passive vibration measurement device 112, a memory 130, a processor 120, a wireless communication transceiver 150, a Radio Frequency Identification (RFID) module 195, and a wired communication interface 190. Each of these elements is communicatively coupled over bus 140.

Magnetic field measuring device 410 is coupled to housing 105 and offset from the surface of power tool 402. Sound measuring device 410 includes a magnetic field probe that senses the changes in magnetic field induced by the motion of a shaft 411 of power tool 402. Magnetic field measuring device 410 is configured to generate an electrical signal 413 indicative of the motion generated by power tool 402. As depicted in FIG. 7, magnetic field measuring device 410 includes an analog to digital converter (ADC). Thus, magnetic field measuring device 410 is able to generate a digital signal 413 indicative of the motion generated by power tool 402. In some other embodiments, the magnetic field measuring device 410 generates an analog output and a separate ADC is employed to generate a digital signal indicative of the motion generated by power tool 402.

Figure 2:
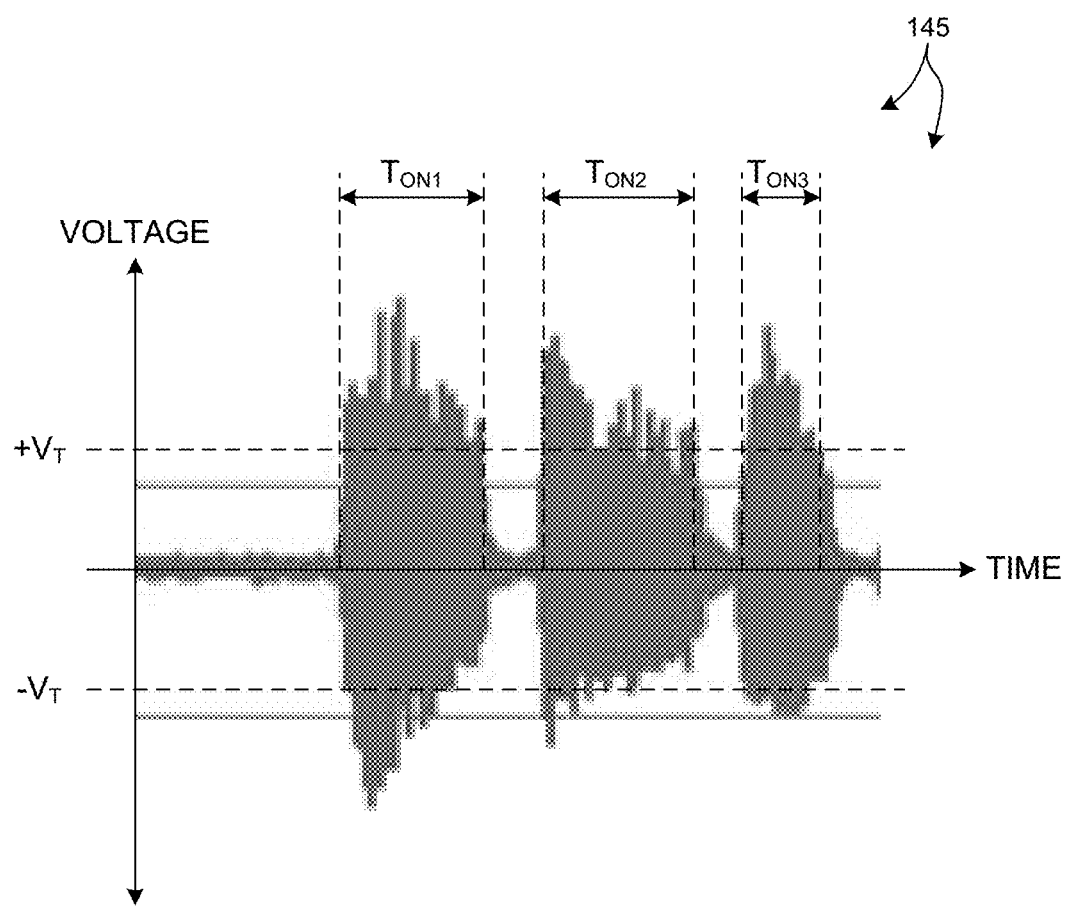
FIG. 2 illustrates a plot 145 of a time trace of an electrical signal indicative of the sound emitted from the surface of a power tool for three on/off cycles of the tool.

Processor 120 is configured to receive signal 113 and generate a signal indicative of actual tool usage based on signal 113. For example, FIG. 2 illustrates a plot 145 of a time trace of an electrical signal indicative of the sound emitted from the surface of a power tool for three on/off cycles of the tool. Processor 120 is configured to determine the transition between an off cycle and an on cycle by identifying when the magnitude of signal 113 exceeds a predetermined threshold value (e.g., $+V_T$). Similarly, processor 120 is configured to determine the transition between an on cycle and an off cycle by identifying when the magnitude of signal 113 is less than the predetermined threshold value (e.g., $+V_T$). In addition, processor 120 is configured to determine each period of time (e.g., $T_{on1}$, $T_{on2}$, and $T_{on3}$) when the magnitude of signal 113 exceeds a predetermined threshold value (e.g., $+V_T$), thus indicating tool usage over each of these periods of time.

In one example, processor 120 generates a signal indicative of the cumulative amount of time the tool has been used (e.g., $T_{on1}+T_{on2}+T_{on3}$) as an indication of actual tool usage.

In another example, processor 120 compares the duration of each period of tool use with a predetermined time window indicative of a successful tool operation, and determines an indication of actual tool usage based on the comparison. For repetitive assembly tasks, the duration of time of power tool use is indicative of whether or not the task was successfully performed. For example, based on experience it is known that it takes a given power tool two seconds with a tolerance of ten percent (e.g., 1.8 second to 2.2 seconds) of actual use to properly secure two particular plastic parts together with a particular screw. In this example, processor 120 compares the duration of each period of tool use (e.g., $T_{on1}$, $T_{one}$, and $T_{on3}$) with the known range of time duration for successful tool operation and determines whether each tool cycle has successfully performed the task. In this example, processor 120 is configured to generate a signal indicative of whether or not a successful tool operation has occurred.

In yet another example, processor 120 compares the amplitude achieved during each tool usage cycle to a second predetermined threshold value to determine degradation or failure of a particular power tool. For example, if the peak amplitude achieved during each tool cycle slowly decreases, this may be indicative of a degradation of the tool itself, or its power supply. In another example, if the peak amplitude achieved during each tool cycle suddenly decreases, this may be indicative of a sudden failure of the power tool.

PTUA 101 includes one or more communication interfaces (e.g., wireless communication transceiver 150 and a wired communication interface 190) to transmit signals indicative of actual tool usage from power tool 102 to an external computing system (not shown). In one example, wireless communication transceiver 150 is configured to transmit signals 152 indicative of actual tool usage. In another example, wired communication interface 190 is configured to transmit signals 192 indicative of actual tool usage.

In some embodiments, a PTUA 101 includes a near field communication (NFC) device such as radio frequency identification (RFID) module 195. In one example, RFID module 195 is configured to transmit signals 197 indicative of a unique identity of PTUA 101 (e.g., a unique identification code such as a serial number). It may be desirable to employ an RFID device as a low power data storage device that can be read by an external computing system without using power on-board PTUA 101. This is particularly useful when long battery life (e.g., greater than six months) of PTUA 101 is desired. In one example, RFID module 195 is configured to transmit signals 197 that are also indicative of actual tool usage.

As discussed hereinbefore, in some examples, predetermined threshold values provide a basis for analysis of signals indicative of the sound emitted from the surface of power tool 102.

In some examples, one or more predetermined threshold values are received by PTUA 101 from an external computing system over a communication interface. For example, PTUA 101 may receive a signal 153 indicative of one or more predetermined threshold values over wireless communication transceiver 150. In another example, PTUA 101 may receive a signal 191 indicative of one or more predetermined threshold values over wired communication interface 190. In another example, PTUA 101 may receive a signal 198 indicative of one or more predetermined threshold values over RFID module 195.

In some other examples, one or more predetermined threshold values are determined based on an analysis of a "master" signal indicative of a desirable sound emitted from the surface of power tool 102.

In some examples, the "master" signal is received by PTUA 101 from an external computing system over a communication interface as described hereinbefore.

In some other examples, the "master" signal is a recording of sound emitted from the surface of power tool 102 during one or more desirable tool operations. In one example, PTUA 102 includes an input device 160 (e.g., a push button momentary switch, etc.). When input device 160 receives a mechanical input (e.g., button press) from a user, a signal 161 is generated. In response, processor 120 initiates a recording of the sound emitted from the surface of power tool 102. The duration of the recording may, for example, be for a fixed period of time, or in another example, for as long as the user continues to interact with input device 160. The recorded sound emitted from the surface of power tool 102 is stored in memory 131 as a "master" signal.

In some examples the stored "master" signal is analyzed to determine predetermined threshold values used in subsequent analyses of measured signals. In some examples, one or more predetermined threshold values are determined as a percentage of the maximum voltage of a master profile.

In some embodiments, PTUA 101 includes a display device 170. Display device 170 is configured to receive signal 171 and communicate an indication of the actual tool usage to a user of the power tool. In one embodiment, display device 170 is an LCD screen that renders a symbol to a user indicating whether or not a successful tool operation has occurred. In another example, the LCD screen renders a symbol to a user indicating that the power tool is due for maintenance, calibration, or repair. In another embodiment, display device 170 is an LED or array of LEDs. In general any number of different combinations of light emitting devices may be employed to indicate actual tool usage.

In another embodiment, display device 170 could be a head up display (HUD). Such a display allows users to keep their eyes on the interaction between the tool and the work piece while receiving indications of tool usage from PTUA 101. In this manner, a user does not have to shift attention from the interaction between the tool and the work piece to read the visual cues offered by display device 170. Examples of suitable HUD devices include head mounted display devices such as Google Glass™, manufactured by Google Inc., Mountain View, Calif. (USA).

In general, display device 170 could be any device suitable for communicating indications of actual tool usage. In some alternative embodiments, an audio device may be employed, alternatively, or in combination with display device 170. By way of non-limiting example, a sequence of audible tones may be generated by the audio device to indicate actual tool usage.

In another further aspect, PTUA 101 includes a passive vibration measurement device 112, such as a piezoelectric vibration sensor to detect vibration of power tool 102. The passive vibration measurement device 112 is able to generate a signal 114 indicative of the presence of vibration of power tool 102 without electrical power consumption. In turn, signal 114 can be employed as a trigger signal to "wake-up" electronic circuits of PTUA 101. In this manner, PTUA 101 can operate in a "sleep" mode with a minimum of power consumption, until triggered by vibration signal 114 to "wake-up" and begin monitoring actual tool usage. This may be particularly advantageous with long battery life of PTUA 101 is desired.

In another further aspect, actual tool usage, tool degradation or failure, or success or failure of tool operation may be based on measurements of vibration emitted from the tool, alone, or in combination with sound measurements.

Figure 5:
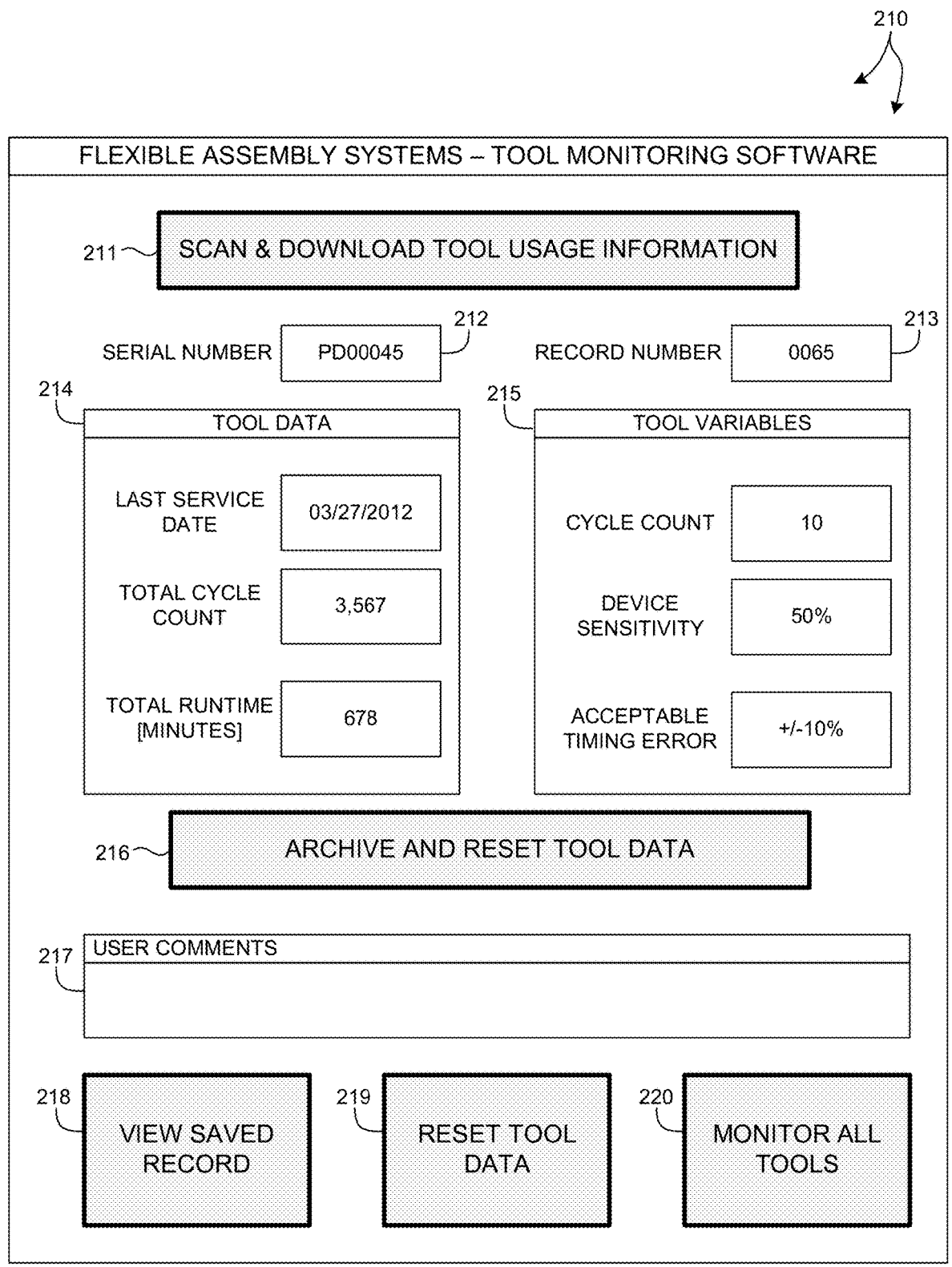
FIG. 5 illustrates a graphical user interface (GUI) configured to present actual tool usage data to a user of a computing system.

In yet another further aspect, data communicated from the PTUA 101 is presented on a display of an external computing system. FIG. 5 illustrates a graphical user interface (GUI) configured to present actual tool usage data to the user of the external computing system. An external computing system may be a personal computer, mobile computer, or other electronic device configured to receive actual tool usage data from PTUA 101, process the data, and present useful indications (e.g., performance metrics, maintenance logs, estimations of remaining tool life, etc.) to a user.

FIG. 5 illustrates an exemplary graphical user interface (GUI) display 210 running on the external computing system in one embodiment. GUI display 210 is provided by way of non-limiting example as many other display options may be contemplated within the scope of this patent document. GUI display 210 includes a button 211 that when activated by a user (e.g., by a finger press on a touch sensitive screen or by a mouse over and click operation, etc.) causes the external computing system to scan for communication signals from nearby PTUA devices and download up-to-date tool usage information. GUI display 210 also includes a dialog box 212 indicating the serial number of a PTUA device, dialog box 213 indicating a record number associated with this particular PTUA device, dialog box 214 indicating tool data associated with the PTUA device, dialog box 215 indicating tool variables currently programmed into the PTUA device, and dialog box 217 indicating any user comments that might be entered by a user. GUI display 210 also includes button 218 that when activated by a user causes the external computing system to display the previously saved record on the display. GUI display 210 also includes button 219 that when activated by a user causes the external computing system to reset the tool data currently associated with the PTUA device. GUI display 210 also includes button 220 that when activated by a user causes the external computing system to monitor all tools that are communicatively linked with the external computing system.

In yet another further aspect, PTUA 101 may be configured to perform a frequency analysis of signals 113 to determine frequency components of the measured signals. These frequency components may be employed to determine indications actual tool usage such as tool degradation or failure or success or failure of tool operation.

Figure 3:
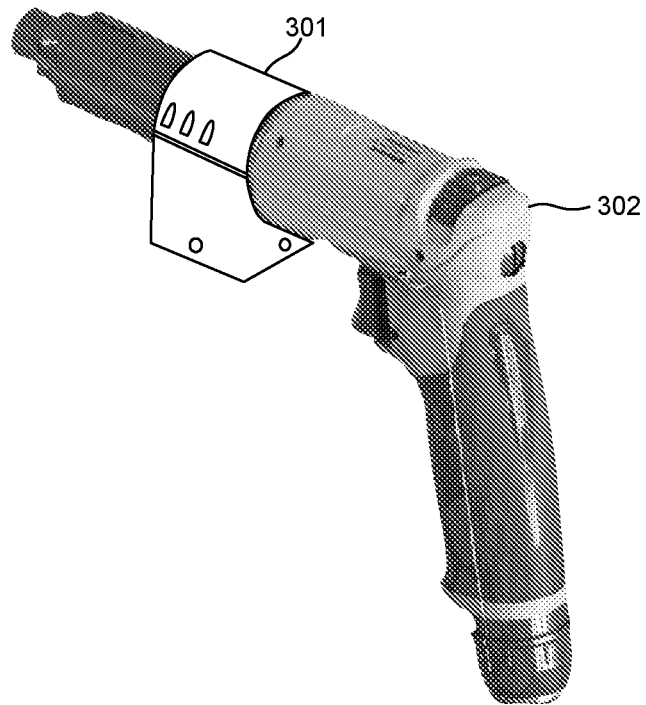
FIG. 3 illustration an embodiment of a power tool usage auditor (PTUA) 301 mounted to a hand-held powered screwdriver tool 302.
Figure 4:
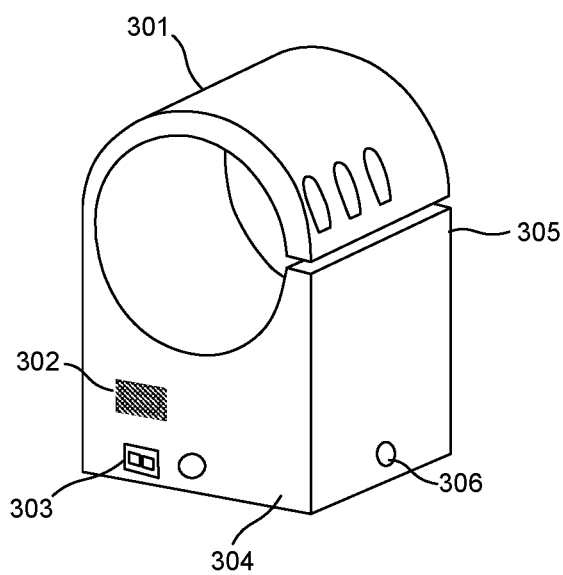
FIG. 4 illustrates the embodiment of PTUA 301 in greater detail.

FIG. 3 is an illustration of a PTUA 301 mounted to a hand-held powered screwdriver tool 302 in one embodiment. FIG. 4 illustrates the embodiment of PTUA 301 in greater detail. As illustrated, PTUA 301 includes a housing 305 configured to be mounted to a wide variety of power tools. PTUA 301 also includes a universal serial bus (USB) communications interface port 302 to provide charge to a battery located within PTUA 305 and provide a wired communications interface over which tool data may be downloaded and tool parameters may be uploaded as described hereinbefore. In this particular embodiment PTUA 301 includes an on/off switch 303 and an LED 306 to provide operational feedback to a user. In addition, PTUA 304 includes an RFID device 304 to store tool usage information, unit serial number data, etc.

Although power tool 302 is illustrated as a hand-held powered screwdriver, in general, any powered tool may be contemplated within the scope of this patent document.

It should be recognized that the various steps described throughout the present disclosure may be carried out by a single computer system or, alternatively, a multiple computer system. Moreover, different subsystems of the system, such as the sound measurement sensor, may include a computer system suitable for carrying out at least a portion of the steps described herein. Therefore, the aforementioned description should not be interpreted as a limitation on the present invention but merely an illustration.

In addition, the computer system described herein may be communicatively coupled to any other subsystem (e.g., a display device, an sound measurement sensor, an input device, etc.) in any manner known in the art. For example, the one or more computing systems may be coupled to computing systems associated with the display device and sound measurement sensor. In another example, any of the input device, sound measurement sensor, and display device may be controlled directly by a single computer system.

The computer system may be configured to receive and/or acquire data or information from the subsystems of the system (e.g., input device, sound measurement sensor, and the like) by a transmission medium that may include wireline and/or wireless portions. In this manner, the transmission medium may serve as a data link between the computer system and other subsystems of the system.

By way of non-limiting example, the computing system of PTUA 101 may include, but is not limited to, a microcontroller, microcomputer, or any other device known in the art. In general, the term "computing system" may be broadly defined to encompass any device having one or more processors, which execute instructions from a memory medium.

Program instructions 132 implementing methods such as those described herein may be transmitted over a transmission medium such as a wire, cable, or wireless transmission link. For example, as illustrated in FIG. 1, program instructions stored in memory 130 are transmitted to processor 120 over bus 140. Program instructions 132 are stored in a computer readable medium (e.g., memory 130). Exemplary computer-readable media include read-only memory, a random access memory, a magnetic or optical disk, etc.

Figure 6:
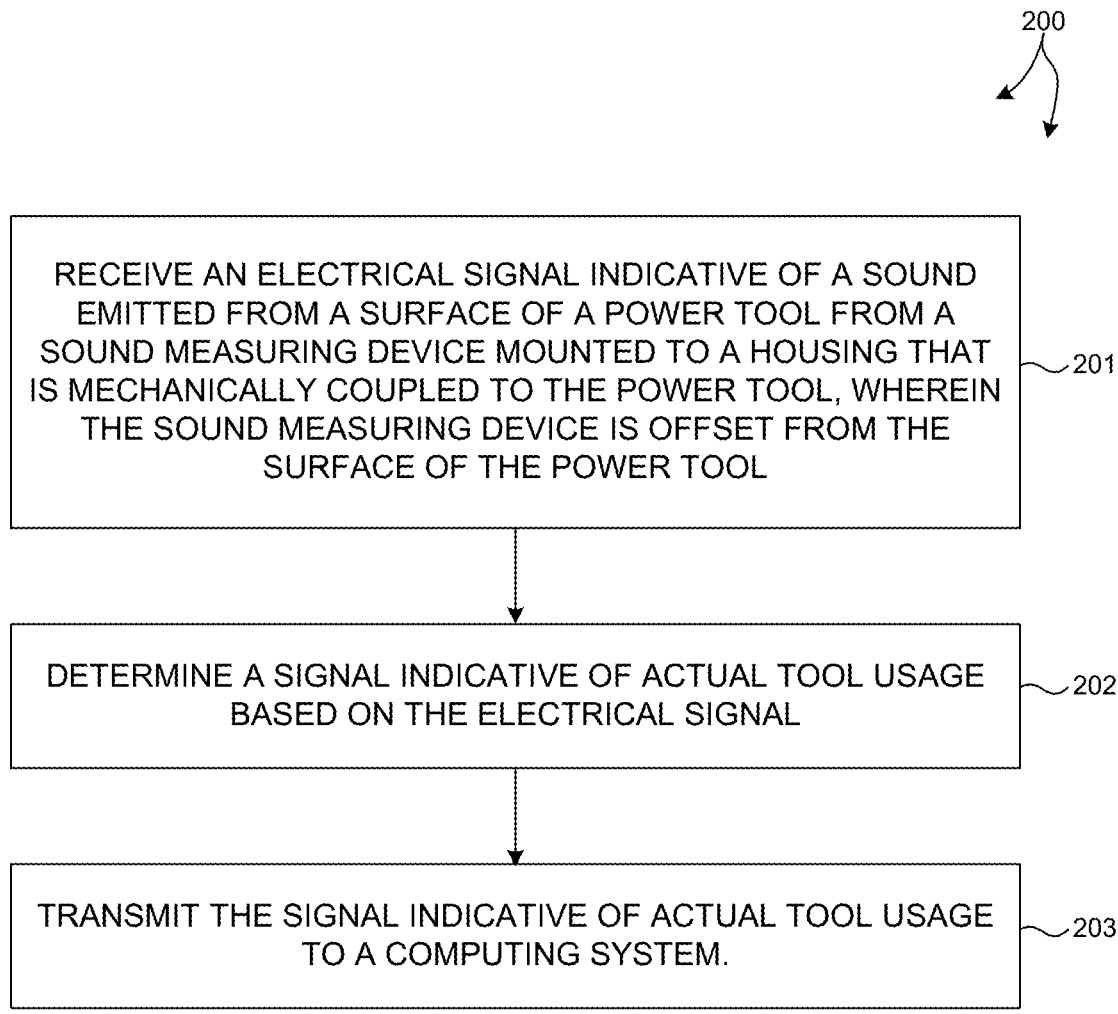
FIG. 6 illustrates a flowchart of an exemplary method 200 useful for determining actual tool usage based on sound measurements of a power tool.

FIG. 6 illustrates a flowchart of an exemplary method 200 useful for determining actual tool usage based on sound measurements of a power tool. In one non-limiting example, system 100, described with reference to FIG. 1 is configured to implement method 200. In one aspect, it is recognized that data processing blocks of method 200 may be carried out via a pre-programmed algorithm executed by one or more processors of PTUA 101. However, in general, the implementation of method 200 is not limited by the specific embodiments described herein.

In block 201, a computing system of PTUA 101 receives an electrical signal indicative of a sound emitted from a surface of a power tool from a sound measuring device mounted to a housing that is mechanically coupled to the power tool, wherein the sound measuring device is offset from the surface of the power tool.

In block 202, the computing system determines a signal indicative of actual tool usage based on the electrical signal.

In block 203, the signal indicative of actual tool usage is transmitted to an external computing system.

Hereinbefore, many aspects of PTUA 101 are described in detail with reference to system 100 depicted in FIG. 1. However, in general, the same description applies to analogous elements of PTUA 401 of system 400 depicted in FIG. 7, except that the signals indicative of sound generated by power tool 102 are replaced by signals indicative of motion generated by power tool 402.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media, and communication media, including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. An apparatus comprising:
   a housing directly coupled to a power tool over a mechanical interface area, the housing not in contact with a portion of a surface of the power tool;
   a sound measuring device coupled to the housing and offset from the portion of the surface of the power tool not mechanically coupled to the housing, the sound measuring device configured to generate an electrical signal indicative of a sound emitted from the portion of the surface of the power tool, wherein the housing provides a direct path enclosed by the housing for sound waves to travel from the power tool to the sound measuring device across the portion of the surface of the power tool not mechanically coupled to the housing;
   a processor configured to:
   receive the electrical signal; and
   generate a signal indicative of actual tool usage based on the electrical signal indicative of the sound emitted from the surface of the power tool; and a communications device configured to transmit the signal indicative of actual tool usage.

2. The apparatus of claim 1, wherein the generating of the signal indicative of actual tool usage involves determining a length of time that the electrical signal indicative of the sound emitted from the surface of the power tool is greater in amplitude than a predetermined threshold value.

3. The apparatus of claim 2, further comprising:
   an input device configured to:
   receive a mechanical input from a user, wherein the processor initiates a master recording of the electrical signal indicative of the sound emitted from the surface of the power tool in response to the mechanical input from the user.

4. The apparatus of claim 3, further comprising:
   determining the predetermined threshold value based on a percentage of a maximum amplitude of the master recording of the electrical signal.

5. The apparatus of claim 2, further comprising:
   receiving a signal indicative of a master recording over the communications device; and
   determining the predetermined threshold value based on a percentage of a maximum amplitude of the received master recording.

6. The apparatus of claim 1, wherein the processor is further configured to determine whether an assembly task is successfully performed based on a comparison between the length of time that the electrical signal indicative of the sound emitted from the surface of the power tool is greater in amplitude than a predetermined threshold value and a predetermined length of time associated with successful task performance.

7. The apparatus of claim 6, further comprising:
   a display device configured to present an indication to a user based on whether a successful tool operation has occurred.

8. The apparatus of claim 1, wherein the processor is further configured to determine whether a failure of the power tool has occurred based at least in part on the electrical signal indicative of the sound emitted from the surface of the power tool.

9. The apparatus of claim 1, further comprising:
   a passive vibration measurement device configured to passively generate a second electrical signal based on a mechanical vibration generated by the power tool.

10. The apparatus of claim 9, wherein an amount of electrical power is supplied to the processor in response to the second electrical signal.

11. A method comprising:
    receiving an electrical signal from a sound measuring device mounted to a housing, the electrical signal indicative of a sound emitted from a portion of a surface of a power tool not in contact with the housing, the housing directly coupled to the power tool over a mechanical interface area, wherein the sound measuring device is offset from the portion of the surface of the power tool not in contact with the housing, and wherein the housing provides a direct path enclosed by the housing for sound waves to travel from the power tool to the sound measuring device across the portion of the surface of the power tool not mechanically coupled to the housing;
    determining a signal indicative of actual tool usage based on the electrical signal; and
    transmitting the signal indicative of actual tool usage to a computing system.

12. The method of claim 11, wherein the determining the signal indicative of actual tool usage involves determining a length of time that the electrical signal indicative of the sound emitted from the surface of the power tool is greater in amplitude than a predetermined threshold value.

13. The method of claim 12, further comprising:
    receiving a mechanical input from a user; and
    generating a master recording of the electrical signal indicative of the sound emitted from the surface of the power tool in response to the mechanical input from the user.

14. The method of claim 13, further comprising:
    determining the predetermined threshold value based on a percentage of a maximum amplitude of the master recording of the electrical signal.

15. The method of claim 12, further comprising:
    receiving a signal indicative of a master recording over the communications device; and determining the predetermined threshold value based on a percentage of a maximum amplitude of the received master recording.

16. The method of claim 12, further comprising:
determining whether an assembly task is successfully performed based on a comparison between the length of time that the electrical signal indicative of the sound emitted from the surface of the power tool is greater in amplitude than the predetermined threshold value and a predetermined length of time associated with successful task performance.

17. The method of claim 16, further comprising:
presenting an indication to a user that a successful tool operation has occurred.

18. The method of claim 11, further comprising:
determining whether a failure of the power tool has occurred based at least in part on the electrical signal indicative of the sound emitted from the surface of the power tool.

19. The method of claim 11, further comprising:
passively generating a second electrical signal based on a mechanical vibration generated by the power tool, wherein the second electrical signal is passively generated by a passive vibration measurement device.

20. The method of claim 19, further comprising:
supplying an amount of electrical power to a processor configured to determine the signal indicative of actual tool usage based on the electrical signal in response to the second electrical signal.

\* \* \* \* \*